United States Patent Office 3,814,807
Patented June 4, 1974

3,814,807
NEMATODE CONTROL EMPLOYING CERTAIN HALO-α-ALKYL-BENZYL ALCOHOLS
Hsing Y. Fan, Modesto, Calif., assignor to Shell Oil Company, Houston, Tex.
No Drawing. Filed Dec. 30, 1970, Ser. No. 102,994
Int. Cl. A01n 9/24, 9/20
U.S. Cl. 424—343
4 Claims

ABSTRACT OF THE DISCLOSURE

Halo-α-alkyl-benzyl alcohols and their derivatives are used for the control of soil-borne nematodes.

FIELD OF THE INVENTION

This invention relates to the control of soil-dwelling nematodes. It has been found that halo-α-alkyl-benzyl alcohols and their derivatives are excellent nematicides.

DESCRIPTION OF THE PRIOR ART

Many halo-α-alkyl-benzyl alcohols are known and their use as bactericides and fungicides is disclosed in U.S. 3,151,018, as herbicides, in U.S. 3,375,906; as a plasticizer in U.S. 2,315,557. The use of the benzyl ester of 3-chloropropionic acid as a nematicide is disclosed in U.S. 3,084,094 and Japanese Publication No. 12,400/60.

SUMMARY OF THE INVENTION

It has now been found that halo-α-alkyl-benzyl alcohols and their derivatives are excellent nematicides. The majority of the benzyl alcohol derivatives are essentially non-phytotoxic to living plants and can, therefore, be used to control nematodes in the soil in which plants are growing or in which plants are soon to be planted, without risk of damage to the plants by the nematicide.

DESCRIPTION OF THE PREFERRED EMBODIMENT

These nematicides are halo-α-alkyl-benzyl alcohol derivatives and are represented by the formula:

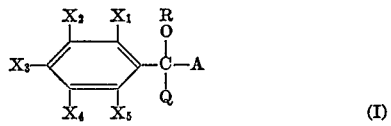

wherein R represents hydrogen; alkyl, alkyl interrupted by one or more oxygen atoms; acetyl, acetyl substituted by halogen of atomic number 9–35, that is, fluorine, chlorine or bromine; alkanoyl having one or more carbonyl groups in the alkyl portion; carbamoyl, N-alkylcarbamoyl or N,N-dialkylcarbamoyl; Q represents hydrogen, cyano, alkyl or alkyl substituted by halogen of atomic number 9–35, A is alkyl of 1 to 7 carbon atoms, e.g., ethyl, methyl or butyl or alkyl substituted by halogen of atomic number 9–35, for example, fluoromethyl, chloroethyl or bromomethyl, and $X_1$, $X_2$, $X_3$, $X_4$ and $X_5$ are independently hydrogen or halogen of atomic number 9–35, that is, fluorine, chlorine or bromine.

Particularly nematicidally active compounds of this invention are represented by Formula I wherein R represents hydrogen, acetyl, haloacetyl, carbamoyl, N-alkylcarbamoyl, or N,N-dialkylcarbamoyl, e.g., N-methylcarbamoyl, N,N-diethylcarbamoyl; A represents methyl or ethyl or methyl or ethyl substituted by 1 to 3 halogen atoms of atomic number 9–35, e.g., dichloromethyl, bromomethyl, trifluoromethyl; and Q is hydrogen or cyano.

In the most preferred class of compounds, having very high nematicidal activity, R represents hdyrogen, acetyl or chloroacetyl; each X is independently hydrogen, chlorine, or bromine; A represents $CY_3$ wherein each Y is selected independently from hydrogen, chlorine, bromine, and alkyl; and Q is hydrogen or cyano.

Typical members of this class of nematicides thus include 2,4-dichloro-α-(difluoromethyl)benzyl alcohol,
2,4-dichloro-α-pentylbenzyl alcohol,
3,4-dichloro-α-ethylbenzyl alcohol,
3,4-dichloro-α-propylbenzyl alcohol,
3,4-dichloro-α-(chloromethyl)mandelonitrile,
2,4-dichloro-α-(1,2-dichloroethyl)mandelonitrile,
2,4,6-trichloro-α-ethylmandelonitrile,
2,4,5-trichloro-α-ethylmandelonitrile,
2,4,5-trichloro-α-methylmandelonitrile,
2-fluoro-4-bromo-α-(chloromethyl)benzyl alcohol,
2-fluoro-4-chloro-α-(chloromethyl)benzyl alcohol,
2,4-dichloro-α-(chloromethyl)benzyl acetate,
3,4-dichloro-α-(chloromethyl)benzyl acetate,
3,4-dichloro-α-methylbenzyl chloroacetate,
3,4-dichloro-α-propylbenzyl chloroacetate,
3,4,5-trichloro-α-methylbenzyl acetate,
2,4-dichloro-α-(chloromethyl)benzyl 4-chloroacetoacetate,
3,4-dichloro-α-(chloromethyl)benzyl methylcarbamate,
2,4-dichloro-α-ethylbenzyl methylcarbamate,
4-chloro-α-(dichloromethyl)benzyl methylcarbamate,
2,4-dichloro-α-(chloromethyl)benzyl dimethylcarbamate,
3,4-dichloro-α-(chloromethyl)benzyl methylcarbamate, and
3,4-dichloro-α-methylbenzyl dimethylcarbamate.

The benzyl alcohols of the invention are readily prepared by known reactions for the preparation of alcohols, for example, by reduction of the appropriate carbonyl-containing aromatic compound with a reducing agent, e.g., sodium borohydride or aluminum alkoxide, or by reaction with the appropriate halomethane in the presence of strong base, etc. The esters, cyanohydrins and various other derivatives of the benzyl alcohols are prepared by methods well known to those skilled in the art. Some of the preferred methods of preparing these compounds are illustrated in the following examples. The structures of the compounds described in the following examples were established by elemental, infrared and/or NMR analyses.

Example I 223.5 grams of 2,2',4'-trichloroacetophenone and 122.5 grams aluminum isopropoxide were added to 800 milliliters of isopropyl alcohol in a 2-liter flask. The solution was heated to a kettle temperature of 83° C. and refluxed for 17½ hours at a kettle temperature of 83° C. to 86° C. while slowly removing a distillate of acetone and isopropyl alcohol. Ice containing 150 milliliters hydrochloric acid was added to the residue and the aqueous phase was extracted with methylene chloride. Evaporation of the solvent left a residue which was crystallized from hexane to give 150 grams of 2,4-dichloro-α-(chloromethyl)benzyl alcohol, M.P. 50°–51.5° C., in 85% yield.

Examples II–IV

Using the method of Example I, the following benzyl alcohols were made:

Example No.: Alcohol
II _____ 4-fluoro-α-methyl-benzyl alcohol.
III _____ 2-bromo-5-chloro-α-(dichloromethyl)benzyl alcohol.
IV _____ 2,5-dichloro-α-(dichloromethyl)-benzyl alcohol.

Example V 150 grams of 2,2,2',4'-tetrachloroacetophenone was dissolved in 700 milliliters tetrahydrofuran and heated to 50°–60° C. 23 grams of sodium borohydride in 50 milliliters water was added dropwise over 1 hour. The solution was heated at 50° to 60° C. for two hours, cooled diluted with 1.5 liters methylene chloride, washed, dried and stripped to 140 grams oil. The oil was distilled to give 120 grams of 2,4-dichloro-α-(dichloromethyl)benzyl alcohol boiling at 110° to 112° C. at 0.01 torr.

Examples VI–XV

Using the method of Example V, the following benzyl alcohols were made:

| Example number | Alcohol | Boiling point or melting point |
| --- | --- | --- |
| VI | 3,4-dichloro-α-(chloromethyl)-benzyl alcohol. | 91.2° C. at .05 torr. |
| VII | 2,4-dichloro-α-methylbenzyl alcohol. | 85°–87° C. at 0.01 torr. |
| VIII | 2,5-dichloro-α-methylbenzyl alcohol. | 62°–63° C. |
| IX | 2,5-dichloro-α-(chloromethyl)-benzyl alcohol. | 85°–86° C. |
| X | 3,4-dichloro-α-methylbenzyl alcohol. | 90° C. at 0.07 torr. |
| XI | 4-chloro-α-(chloromethyl)-benzyl alcohol. | 100°–102° C. at 0.02 torr. |
| XII | 2,4-dichloro-α-(bromomethyl)-benzyl alcohol. | 69°–71° C. |
| XIII | 2,4,5-trichloro-α-methylbenzyl alcohol. | 85°–86° C. |
| XIV | 2,4,5-trichloro-α-(chloromethyl)-benzyl alcohol. | 65°–67° C. |
| XV | 3,4,5-trichloro-α-methylbenzyl alcohol. | 89°–90° C. |
| XVI | 2,4-dichloro-α-propylbenzyl alcohol. | 88°–90° C. at 0.1 torr. |

Example XVII 52 grams of 2,3,6-trichlorobenzaldehyde and 337 grams chloroform in a 1-liter reaction flask was cooled to 5°–10° C. A solution of 8.4 grams potassium hydroxide and 5.5 grams sodium hydroxide in 2-(2-methoxyethyoxy)-ethanol was added over a period of 20 minutes. The reaction mixture was stirred for 3 days. Then 50 milliliters concentrated hydrochloric acid was added dropwise. The chloroform layer was separated, washed with water, neutralized, dried, filtered and concentrated. The concentrate was vacuum distilled to yield 18 grams of 2,5,6-trichloro-α-(trichloromethyl)benzyl alcohol, boiling at 160° C. at 0.3 torr.

Example XVIII

Using the same method as in Example XVII, benzaldehyde was reacted with chloroform and potassium hydroxide to yield α-(trichloromethyl)benzyl alcohol, boiling at 120°–121° C. at 1.7 torr.

Example XIX 87.5 grams of 2,6-dichlorobenzaldehyde in 400 milliliters ether was added over a 20 minute period of 10°–15° C. to a stirred solution of Grignard reagent prepared from 19.1 grams magnesium and 106 grams methyl iodide in 300 milliliters ether. 20 milliliters water in 40 milliliters tetrahydrofuran was added to the reaction mixture, followed by solution of 80 milliliters concentrated hydrochloric acid diluted with water to 200 milliliters. The organic phase was separated, dried, and stripped to yield 2,6-dichloro-α-(methyl)benzyl alcohol.

Example XX 11.3 grams of 2,4-dichloro-α-(chloromethyl)benzyl alcohol was dissolved in 60 milliliters benzene. To this reaction mixture was added 5.6 grams chloroacetyl chloride in 20 milliliters benzene at 5° C. over a period of 30 minutes. The mixture was stirred for 1½ hours at room temperature. The mixture was filtered and the filtrate was washed first with dilute hydrochloric acid and then with water. Solvent was removed by evaporation and the product was distilled at 141° C. at 0.08 torr. The resultant 2,4-dichloro-α-(chloromethyl)benzyl chloroacetate melted at 54°–55° C. The structure of the product was confirmed by elemental analysis.

Analysis (percent by weight)—Calculated: Cl, 47.0. Found: Cl, 47.1.

Example XXI

The procedure of Example XX was used to react 2,4-dichloro-α-(chloromethyl)benzyl alcohol and acetyl chloride to yield 2,4-dichloro-α-(chloromethyl)benzyl acetate, boiling at 110 to 112° C. at 0.1 torr.

Analysis (percent by weight)—Calculated: Cl, 41.1. Found: Cl, 39.9.

Example XXII 6.5 grams of 2,4-dichloro-α-(chloromethyl)benzyl alcohol was dissolved in 50 milliliters benzene. 6 milliliters methyl isocyanate and a few drops triethylamine were added. After two days, the reaction mixture concentrated to dryness, yielding 8 grams of 2,4-dichloro-α-(chloromethyl)benzyl N-methylcarbamate.

Example XXIII

The procedure of Example XXII was followed in reacting 26 grams of 2,4-dichloro-α-(dichloromethyl)benzyl alcohol with methyl isocyanate. The crystalline 2,4-dichloro-α-(dichloromethyl)benzyl N-methylcarbamate melted at 127° to 128° C.

Example XXIV 25.5 milliliters diketene in 100 milliliters methylene chloride in a 250 milliliter flask was cooled to −40° C. 23.4 grams chlorine gas was added while maintaining the temperature at −40° C. When the addition of chlorine gas was completed, the reaction mixture was allowed to warm to room temperature and stirred for 45 minutes.

In a 500 milliliter flask, 36.6 grams of α-methylbenzyl alcohol in 100 milliliters methylene chloride were heated to reflux. The chlorinated diketene prepared above was added dropwise over a period of 10 minutes. The reaction mixture was refluxed for 30 minutes. After the mixture cooled to room temperature, it was washed with water, dried and stripped to an oil. The α-methylbenzyl ester of 4-chloroacetoacetic acid was distilled twice in a molecular still at 75° C. and at 105° C. at 0.0002 torr.

Example XXV

Following the procedure of Example XXIV, 27.7 grams diketene, 23.4 grams chlorine gas and 47 grams 4-chloro-α-methylbenzyl alcohol were reacted to yield the 4-chloro-α-methylbenzyl ester of 4-chloroacetoacetic acid.

Example XXVI 19 grams of 2,2',4'-trichloroacetophenone, 30 milliliters hydrogen cyanide and 0.1 gram sodium cyanide were combined in a 300 milliliter flask. The solution was stirred for 5 minutes and then refluxed for one hour. Excess hydrogen cyanide was removed under reduced pressure. The solid product was recrystallized from methylene chloride to yield 10 grams of 2,4-dichloro-α-(chloromethyl)mandelonitrile melting at 80° to 83° C.

Examples XXVII–XXXI

Following the procedure of Example XXVI, the following compounds were prepared:

| Example number | Cyanohydrin | Melting point |
| --- | --- | --- |
| XXVIII | 2,4-dichloro-α-(dichloromethyl)mandelonitrile. | 75°–80° C. |
| XXIX | 2,4-dichloro-α-(trichloromethyl)mandelonitrile. | 138°–142° C. |
| XXX | α-(chloromethyl)mandelonitrile. | 55°–56° C. |
| XXXI | 2,5-dichloro-α-methylmandelonitrile. | 127°–128° C. |

Example XXXII

A solution of 63 grams 2,4-dichloroacetophenone, 41 grams sodium cyanide and 50 milliliters water was cooled to 5° C. 70 milliliters concentrated hydrochloric acid in 50 milliliters water was added dropwise over a period of 3 hours. The flask was then stirred for two hours at room temperature. The ether layer was separated and the aqueous phase was extracted with ether. The combined ether solutions were dried and the solvent was evaporated. The resulting oil was treated with an additional 41 grams sodium cyanide. The 2,4-dichloro-α-methylmandelonitrile was separated by distillation at 80–83° C. at 0.08 torr.

The preparation of various other derivatives of benzyl alcohols, for example, acetals and ethers, may be accomplished by any of the methods known in the art.

The halo-substituted benzyl alcohols and their derivatives have been found to be effective killers of soil-dwelling nematodes—that is, the unsegmented roundworms of the class Nematoda, also known as eelworms, which customarily inhabit soil and feed upon the roots, of plants growing therein. The halo-substituted benzyl alcohols are particularly effective against root-knot nematodes of the genus Meloidogyne.

Example XXXIII

Nematocidal activity was evaluated by means of a water screen test. In this test, the sample compound at 1000 parts per million is suspended in water containing 0.05 percent by weight of nonylphenyl polyethoxy ethanol (Triton X–100) emulsifier. The test solution is innoculated with root-knot nematodes, *Meloidogyne incognita* (var. *acrita*), which are exposed to the test solution for 24 hours. The mortality of the nematode larvae is obtained by transferring the treated larvae to nematode-free soil and seeding the soil with tomatoes which are indicator plants for root-knot infection. The percent control is obtained by comparison of the root infection of the treated larvae with soil innoculated with untreated larvae. The results obtained are summarized in Table I.

TABLE I.—WATER SCREEN TEST TO DETERMINE CONTROL OF ROOT-KNOT NEMATODE

| Compound: | Percent control at 1000 parts per million |
|---|---|
| 2,4-dichloro-α-(chloromethyl)benzyl alcohol | 100 |
| 3,4-dichloro-α-(chloromethyl)benzyl alcohol | 100 |
| 2,4-dichloro-α-(dichloromethyl)benzyl alcohol | 100 |
| 2,4,5-trichloro-α-methylbenzyl alcohol | 100 |
| 2,4,5-trichloro-α-(chloromethyl)benzyl alcohol | 100 |
| 2-bromo-5-chloro-α-(dichloromethyl)benzyl alcohol | 100 |
| 3,4,5-trichloro-α-methylbenzyl alcohol | 93 |
| 4-fluoro-α-methylbenzyl alcohol | 29 |
| 2,5-dichloro-α-(dichloromethyl)benzyl alcohol | 100 |
| α-(Trichloromethyl)benzyl alcohol | 15 |
| 2,3,6-trichloro-α-(trichloromethyl)benzyl alcohol | 100 |
| 2,3,6-trichloro-α-methylbenzyl alcohol | 30 |
| 2,4-dichloro-α-(chloromethyl)benzyl chloroacetate | 14 |
| 4-chloro-α-methyl benzyl 4-chloroacetoacetate | 100 |
| α-Methylbenzyl 4-chloroacetoacetate | 100 |
| 2,4-dichloro-α-ethylbenzyl alcohol | 100 |
| 2,4-dichloro-α-(chloromethyl)benzyl N-methylcarbamate | 40 |
| 2,4-dichloro-α-(chloromethyl)mandelonitrile | 100 |
| 2,5-dichloro-α-(dichloromethyl)mandelonitrile | 100 |
| 2,4-dichloro-α-methylmandelonitrile | 100 |
| 2,4-dichloro-α-(trichloromethyl)mandelonitrile | 100 |
| α-(Chloromethyl)mandelonitrile | 100 |
| 2-fluoro-α-methylmandelonitrile | 29 |
| 2,5-dichloro-α-methylmandelonitrile | 100 |
| 2,3,4-trichloro-α-(dibromomethyl)mandelonitrile | 14 |

TABLE I—Continued

| Compound: | Percent control at 1000 parts per million |
|---|---|
| 2-(4-chlorophenyl)lactonitrile | 100 |
| (α,α-Dimethylbenzyloxy)acetaldehyde dimethyl acetal | 14 |
| 2,4-dichloro-α-(dichloromethyl)mandelonitrile acetate | 14 |
| α,α-Bis(trifluoromethyl)benzyl N-methylcarbamate | 100 |
| 2,5-dichloro-α-methylmandelonitrile acetate | 14 |
| α,α-Bistrifluoromethylbenzyl octyl ether | 60 |
| 2,4-dichloro-α-methylbenzyl alcohol | 100 |
| 2,5-dichloro-α-methylbenzyl alcohol | 100 |
| 3,4-dichloro-α-methylbenzyl alcohol | 100 |
| 4-chloro-α-(chloromethyl)benzyl alcohol | 100 |
| 2,4-dichloro-α-(bromomethyl)benzyl alcohol | 100 |

Example XXXIV

The compounds of the invention were thoroughly mixed with two quarts soil infested with the root-knot nematode, *Meloidogyne incognita* (var. *acrita*). All tests were made in duplicate. In addition two-quart jars of untreated soil served as controls. The samples of soil were held at 80° F. for two and four weeks, then were transferred to 4-inch plant pots and seeded with tomatoes. Tomatoes are excellent indicator plants for evaluation of the presence of root-knot nematodes in the soil. After two and four weeks, the soil was washed from the roots of the plants and the number of root-knot galls, as evidence of the feeding of nematodes, was visually ascertained by experienced observers. The dosages used and the control of nematodes obtained at each dosage of each of the test compounds are set out in Table II. The percent control reported is an average of the two and four week results.

TABLE II.—CONTROL OF ROOT-KNOT NEMATODES IN SOIL AT A DOSAGE OF 0.04 GRAM PER QUART

| Compound: | Control, percent |
|---|---|
| 2,4-dichloro-α-(chloromethyl)benzyl alcohol | 100 |
| 3,4-dichloro-α-(chloromethyl)benzyl alcohol | 100 |
| 2,4-dichloro-α-(dichloromethyl)benzyl alcohol | 98 |
| 2,4,5-trichloro-α-methylbenzyl alcohol | 100 |
| 2,4,5-trichloro-α-(chloromethyl)benzyl alcohol | 87 |
| 2-bromo-5-chloro-α-(dichloromethyl)benzyl alcohol | 100 |
| 3,4,5-trichloro-α-methylbenzyl alcohol | 100 |
| 2,4-dichloro-α-(chloromethyl)benzyl chloroacetate | 100 |
| 2,4-dichloro-α-(chloromethyl)benzyl acetate | 100 |
| 4-chloro-α-methylbenzyl 4-chloroacetoacetate | 10 |
| α-Methylbenzyl 4-chloroacetoacetate | 20 |
| 2,4-dichloro-α-(chloromethyl)benzyl N-methylcarbamate | 43 |
| 2,4-dichloro-α-(chloromethyl)mandelonitrile | 100 |
| 2,4-dichloro-α-methylmandelonitrile | 78 |
| 2,4-dichloro-α-(trichloromethyl)mandelonitrile | 42 |
| α-(Chloromethyl)mandelonitrile | 100 |
| 2,5-dichloro-α-(chloromethyl)mandelonitrile | 90 |
| 2,4-dichloro-α-(dichloromethyl)mandelonitrile acetate | 59 |
| α,α-Bistrifluoromethylbenzyl octyl ether | 43 |
| 2,4-dichloro-α-methylbenzyl alcohol | 100 |
| 2,5-dichloro-α-methylbenzyl alcohol | 85 |
| 2,5-dichloro-α-(chloromethyl)benzyl alcohol | 94 |
| 3,4-dichloro-α-methylbenzyl alcohol | 100 |
| 4-chloro-α-(chloromethyl)benyl alcohol | 100 |
| 2,4-dichloro-α-(bromomethyl)benzyl alcohol | 100 |

The halo-substituted benzyl alcohols and their derivatives of this invention may, if desired, be applied as such to the locus to be treated. Ordinarily and preferably, however, these compounds are used in combination with an inert diluent or carrier to make it easier to measure accurately and to apply evenly the small amounts of the nematicide that are required to control nematode activity as well as to apply them in a form that will be readily dispersed through the soil. These compounds can be mixed with or deposited upon inert particulate solids, such as fullers earth, talc, diatomaceous earth, natural clay, kaolin, walnut shell flour, and the like, to form dry particulate compositions. Such compositions may be employed as dusts, or they may, if desired, be dispersed in water with or without the aid of a surface-active agent. Alternatively, the dry compositions may be formed into granules or pellets by known techniques.

The halo-benzyl alcohols and their derivatives may be dispensed in the form of solutions or dispersions in inert organic solvents or in mixtures of inert organic solvents and water. The solvents that may be used in the preparation of these compositions include both polar and non-polar aliphatic and aromatic solvents including, for example, benzene, toluene, xylene, naphtha, nitrobenzene, dimethylformamide, carbon tetrachloride, acetone, methyl ethyl ketone, ethanol, propanol, butanol, dioxane, and mixtures thereof.

The concentration of the halo-benzyl alcohols and their derivatives in the compositions may vary widely and depends upon a number of factors, among the most important of which are the amount of the composition to be applied per unit of area and the particular nematode pest to be controlled.

The following examples illustrate various formulations that are particularly preferred for use with the compounds of the invention.

Example XXXV

5% granules of 2,4-dichloro-α-(chloromethyl)benzyl alcohol were prepared in granules having the following composition:

|  | Percent by wt. |
|---|---|
| 2,4-dichloro-α-(chloromethyl)benzyl alcohol | 5 |
| Heavy aromatic naphtha | 5 |
| Attaclay 24–48 AARVN (aluminum-magnesium silicate) | 90 |

Example XXXVI

5% granules of 2,3-dichloro-α-(chloromethyl)benzyl alcohol were prepared in granules having the following composition:

|  | Percent by wt. |
|---|---|
| 2,3-dichloro-α-(chloromethyl)benzyl alcohol | 5.5 |
| Celatom MP–78 | 94.5 |

Example XXXVII

An emulsifiable concentrate was prepared by mixing the following components:

|  | Percent by wt. |
|---|---|
| 2,4-dichloro-α-(chloromethyl)benzyl alcohol | 24.8 |
| Gafac RS 710 [1] emulsifier | 9.1 |
| Xylene | 66.1 |

[1] Complex phosphinic acid ester mixture containing some free acid made by G.A.F. Co.

I claim as my invention:

1. A method of controlling nematodes which comprises contacting said nematodes with a nematicidally effective amount of a compound of the formula:

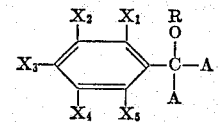

wherein R represents hydrogen; Q represents hydrogen; A is alkyl of 1 to 7 carbon atoms or alkyl of 1 to 7 carbon atoms substituted by one or more fluorine atoms, by one or more chlorine atoms, or by one or more bromine atoms; and $X_1$, $X_2$, $X_3$, $X_4$ and $X_5$ are independently selected from the group consisting of hydrogen, chlorine, bromine, and fluorine.

2. The method according to claim 1 wherein A is methyl or ethyl or methyl or ethyl substituted by 1 to 3 atoms of chlorine, fluorine or bromine.

3. The method according to claim 1 wherein A represents methyl, $X_1$, $X_3$, and $X_4$ represent chlorine, and $X_2$ and $X_5$ represent hydrogen.

4. A method of controlling nematodes which attack plants which comprises contacting said nematodes with a nematicidally effective amount of a compound selected from the group consisting of 2,4-dichloro-α-(chloromethyl)benzyl alcohol, 2,4-dichloro-α-methylbenzyl alcohol, 3,4-dichloro-α-methylbenzyl alcohol, 3,4-dichloro-α-(chloromethyl)benzyl alcohol and 2,4,5-trichloro-α-methylbenzyl alcohol.

References Cited

UNITED STATES PATENTS

| 3,151,018 | 9/1964 | Girard | 424—343 |
| 3,575,096 | 3/1968 | Girard | 71—122 |

OTHER REFERENCES

Chemical Abstracts, vol. 57 (1962), p. 16450d.

VINCENT D. TURNER, Primary Examiner

U.S. Cl. X.R.

260—465 D, 465 F, 482 R, 487, 488; 424—300, 304, 311

UNITED STATES PATENT OFFICE
CERTIFICATE OF CORRECTION

Patent No. 3,814,807                                    Dated June 4, 1974

Inventor(s) Hsing Y. Fan

It is certified that error appears in the above-identified patent and that said Letters Patent are hereby corrected as shown below:

In claim 1, the structural formula

" 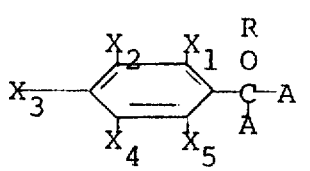 "     should read  -- 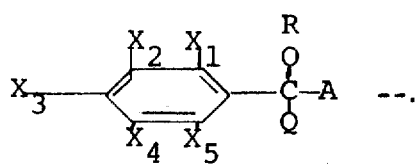 --.

Signed and sealed this 8th day of October 1974.

(SEAL)
Attest:

McCOY M. GIBSON JR.                          C. MARSHALL DANN
Attesting Officer                             Commissioner of Patents